United States Patent
Ahmed

(10) Patent No.: US 7,584,326 B2
(45) Date of Patent: *Sep. 1, 2009

(54) METHOD AND SYSTEM FOR MAXIMUM RESIDENCY REPLACEMENT OF CACHE MEMORY

(75) Inventor: Muhammad Ahmed, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 11/531,111

(22) Filed: Sep. 12, 2006

(65) Prior Publication Data

US 2007/0271417 A1 Nov. 22, 2007

Related U.S. Application Data

(63) Continuation of application No. 11/437,501, filed on May 17, 2006.

(51) Int. Cl.
*G06F 12/12* (2006.01)

(52) U.S. Cl. .................. 711/128; 711/133; 711/136

(58) Field of Classification Search .................. 711/128, 711/133, 136, 159, 160
See application file for complete search history.

(56) References Cited

U.S. PATENT DOCUMENTS

| | | | |
|---|---|---|---|
| 6,694,408 B1* | 2/2004 | Villagomez et al. | 711/133 |
| 7,237,067 B2* | 6/2007 | Steely, Jr. | 711/133 |
| 2002/0010839 A1* | 1/2002 | Tirumala et al. | 711/133 |

* cited by examiner

*Primary Examiner*—Jack A Lane
(74) *Attorney, Agent, or Firm*—Nicholas J. Pauley; Sam Talpalatsky; Peter M. Kamarchik

(57) ABSTRACT

Techniques for use in CDMA-based products and services, including replacing cache memory allocation so as to maximize residency of a plurality of set ways following a tag miss allocation. Herein, steps and instructions provide for forming a first-in, first-out (FIFO) cache way listing of victim ways for the cache memory, wherein the depth of the FIFO cache way listing approximately equals the number of ways in the cache memory. The method and system place a victim way on the FIFO cache way listing only in the event that a tag miss results in a tag miss allocation, the victim way is placed at the tail of the FIFO cache way listing after any previously selected victim way. Use of a victim way on the FIFO cache way listing is prevented in the event of an incomplete prior allocation of the victim way by, for example, stalling a reuse request until such initial allocation of the victim way completes or replaying a reuse request until such initial allocation of the victim way completes.

39 Claims, 5 Drawing Sheets

METHOD AND SYSTEM FOR MAXIMUM RESIDENCY REPLACEMENT OF CACHE MEMORY

This application is a continuation of Utility application Ser. No. 11/437,501 entitled "METHOD ANS SYSTEM FOR MAXIMUM RESIDENCY REPLACEMENT OF CACHE MEMORY" and filed on May 17, 2006.

FIELD

The disclosed subject matter relates to digital signal processing in support of communications products and services. More particularly, this disclosure relates to a novel and improved method and system for maximum residency replacement of cache memory as may find use in a digital signal processor for a handset or other communications system.

DESCRIPTION OF THE RELATED ART

Increasingly, electronic equipment and supporting software applications involve digital signal processing. For example, home theatre, computer graphics, medical imaging and telecommunications applications generally rely on digital signal processing technology. Digital signal processing requires fast math in complex, but repetitive algorithms. Many such applications require computations in real-time, i.e., the signal is a continuous function of time which must be sampled and converted to binary data for numerical processing. The digital signal processor executes algorithms performing discrete computations on the samples as they arrive. The architecture of a digital signal processor or DSP is optimized to handle such algorithms. The characteristics of a good signal processing engine include fast, flexible arithmetic computation units, unconstrained data flow to and from the computation units, extended precision and dynamic range in the computation units, efficient program sequencing, and ease of programming.

One promising application of DSP technology includes communications systems such as a code division multiple access (CDMA) system that supports voice and data communication between users over a satellite or terrestrial link. The use of CDMA processes in a multiple access communication system is disclosed in U.S. Pat. No. 4,901,307, entitled 'SPREAD SPECTRUM MULTIPLE ACCESS COMMUNICATION SYSTEM USING SATELLITE OR TERRESTRIAL REPEATERS," and U.S. Pat. No. 5,103,459, entitled 'SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more telecommunications, and now streaming video, standards. One such first generation standard is the "TIA/EIA/IS-95 Terminal-Base Station Compatibility Standard for Dual-mode Wideband Spread Spectrum Cellular System," hereinafter referred to as the IS-95 standard. The IS-95 CDMA systems are able to transmit voice data and packet data. A newer generation standard that can more efficiently transmit packet data is offered by a consortium named "3rd Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA standard. There are also video compression standards, such as MPEG-1, MPEG-2, MPEG-4, H.264, and WMV (Windows Media Video), as well as many others that such wireless handsets will increasingly employ.

In the operation of a DSP, lower power consumption is of growing importance in data processing systems, for example, due to wide spread use of such portable and handheld applications. Many DSPs today use a smaller, faster, and more efficient memory, sometimes referred to as a cache memory, to reduce the number of accesses to main memory. Accesses to cache memory generally consume less power and result in reduced latencies as compared to accesses to other internal or external memories. By storing those items which will subsequently be requested again in the faster, more efficient cache, significant power reductions and performance increase may occur.

Cache memory also provides the processor with a way to fetch data quickly without incurring the wait states associated with main memory sources, such as DRAM. Using cache memory typically improves computer system performance, making commonly-used data available to the processor without requiring paging cycles or the physical delays occurring from main memory's us of complex bus structures.

Typically, cache memory is organized in "sets" or "ways" (hereafter collectively referred to as "cache ways"). A cache way typically includes of a number of cache memory entry locations that may be accessed using a common address. A set associative cache is a type of cache memory that organizes data in cache ways that are assigned, or "mapped," to a particular location within a main memory sources, such as DRAM. A cache way is re-mapped when data stored within that way is replaced by data from another location within main memory. Furthermore, cache ways may be mapped to the same main memory location in order to help maintain in cache the most current version of data associated with a particular main memory location.

Now, cache memory is typically smaller than main memory, so cache ways need to be deleted to make room for newly accessed data which is not stored in the cache. Those cache ways to be replaced are known as "victim ways." Data applied to the victim ways should be statistically more likely to be accessed again in the near future than is data that has been in the cache for some time. Typically, the cache selects one or more cache entries which are eligible to store data corresponding to a given transaction, and searches these entries to detect a hit or miss. In a set associative cache, two or more entries are eligible to store the data based on the address of the data. The cache way of any one of the two or more entries could be evicted on a miss. Set associative caches employ a replacement policy to select one of the two or more eligible entries for eviction. A variety of replacement policies exist.

Two known types of cache replacement processes are the Least Recently Used ("LRU") and Not Recently Used ("NRU") cache replacement policies. Each of these cache replacement policies requires complex monitoring of the transactions presented to the cache, along with detailed knowledge of the implemented replacement policy to determine the state of the replacement policy at any given point in time. Thus, for each use of the cache way, there is the need to update the storage bit associated with the cache way. This updating is expensive in terms of operational resource use and energy consumption.

Accordingly, there is a need for a low cost, highly efficient cache replacement process that achieves essentially the same performance of the NRU and LRU approaches. Low cost benefits preferably would, therefore, include reducing the storage requirements in the cache replacement process. Also, reducing storage requirements promotes improved energy use during DSP operation.

Another consideration in use of the LRU and NRU processes is of particular relevance in a DSP performing multi-threaded processing. In such a processor, with the LRU and NRU cache replacement policies, there is the recurring need to forward storage bit information from one pipeline to the next. The costs of forwarding the storage bit information from pipeline to pipeline can be excessive, particularly when there is a limited time budget for each pipeline stage. That is, the handling of the storage bit information from one pipeline stage to another may exact an undesirable cost during the multi-threaded operation.

Also, as mentioned above, the handling of storage bits, as is required in the LRU and NRU replacement policies, generally entails the use of wide and large busses to convey storage bit information. Because the large busses that convey the storage bit information consume power and introduce performance delays, there is the need to reduce or eliminate the conveyance of such storage bit information in a cache way replacement policy.

Accordingly, a need exists to improve over the known LRU and NRU cache replacement policies. Particularly, such a need exists in the operation of a multi-threaded DSP or similar processor.

A further need exists to reduce the power consumption and performance delays that exist in known cache replacement processes for a DSP or similar processor.

In essence, therefore, a need exists to eliminate the handling of storage bit information during cache way replacement operations of a DSP or similar processor.

SUMMARY

Techniques here disclosed provide for maximum residency replacement of cache memory in a digital signal processor, which techniques improve both the operation of the processor and the efficient and more rapid processing of digital signal processor instructions. The present disclosure may, for example, benefit a multi-threaded processor system in which a plurality of processor threads share cache memory in an n-way set associative method (where, n is 2 or larger), and more particularly to a replacement control technology that is applicable when a cache way miss occurs. Use of the disclosed subject matter permits increasingly robust software applications for personal computers, personal digital assistants, wireless handsets, and similar electronic devices, as well as increasing the processor speed and service quality.

According to one aspect of the disclosed subject matter, there is provided a method and a system for replacing cache memory allocation so as to maximize residency of a plurality of set ways following a tag miss allocation. The disclosure includes forming a first-in, first-out (FIFO) cache way listing of victim ways for the cache memory wherein the depth of the FIFO cache way listing approximately equals the number of ways in the cache memory.

The method and system place a victim way on the FIFO cache way listing only in the event that a tag miss results in a tag miss allocation, the victim way is placed at the tail of the FIFO cache way listing after any previously selected victim way. Use of a victim way on the FIFO cache way listing is prevented in the event of an incomplete prior allocation of the victim way by, for example, stalling a reuse request until such initial allocation of the victim way completes or replaying a reuse request until such initial allocation of the victim way completes. In addition, the present embodiment skips such ways on the FIFO cache way listing which present a reuse hazard. Thus, if a potential victim way at the top of the FIFO cache way listing presents a reuse hazard, then the present process chooses the next way in the FIFO cache way listing that does not present a reuse hazard. A counter associated with the process, then increments to the next higher numbered cache way (modulo the number of available cache ways). The incrementing here provided will continue until the process selects a useable cache way.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein.

Figure 3:
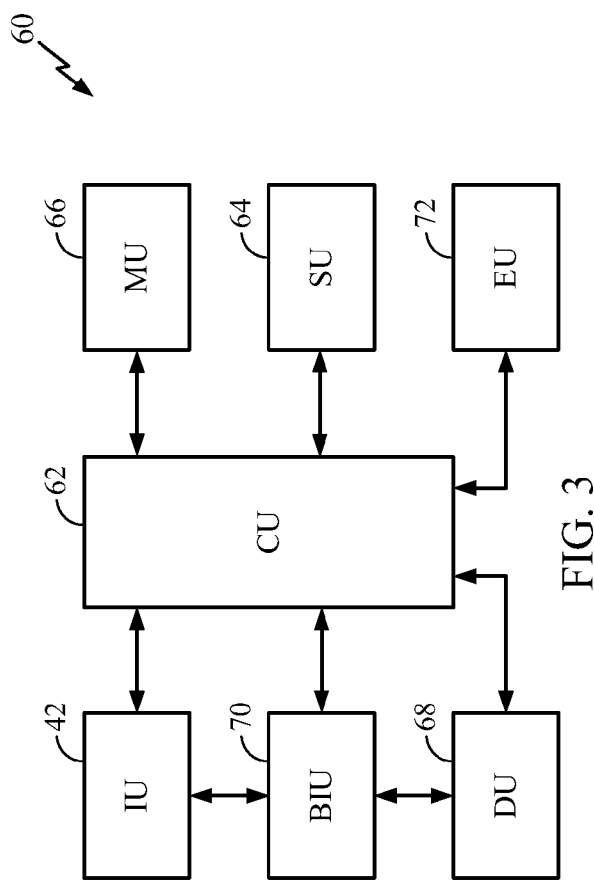
FIG. 3 shows a block diagram of a control unit (CU) as may be operated in a system employing the teachings of the present disclosure.
Figure 4:
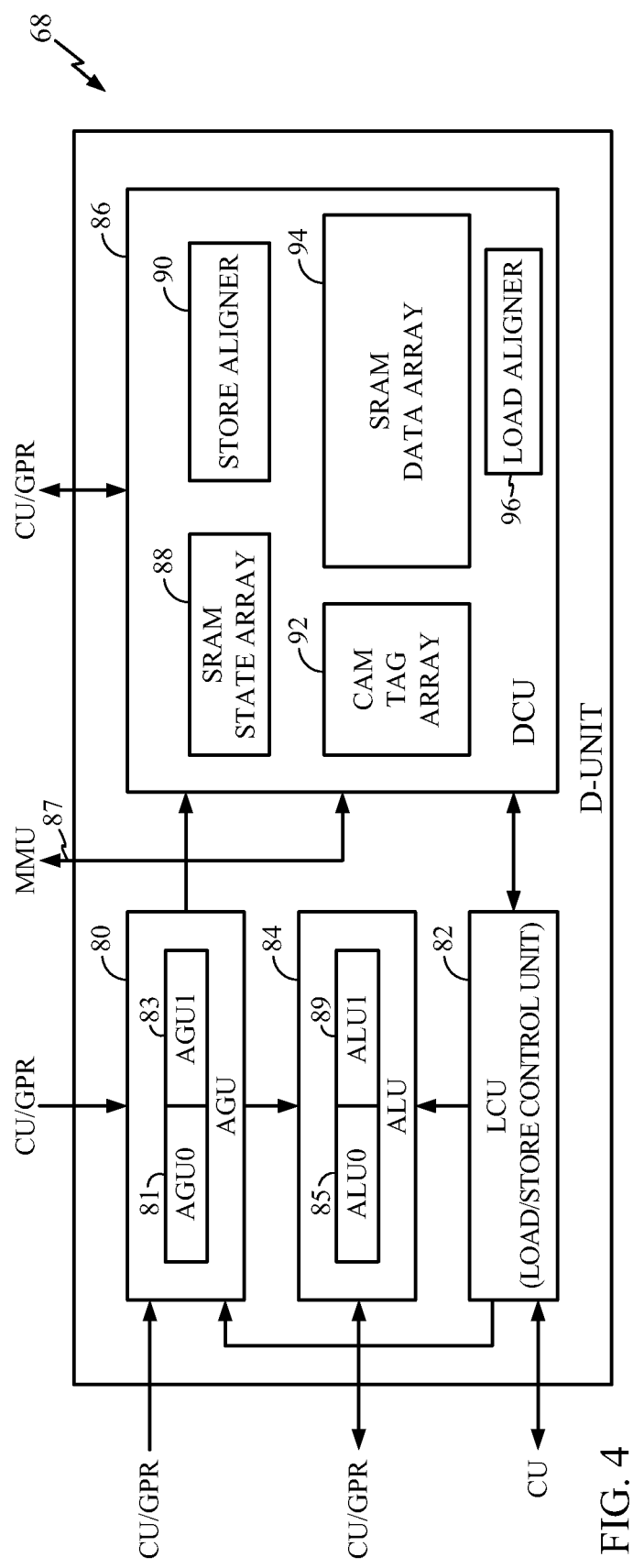
Figure 5:
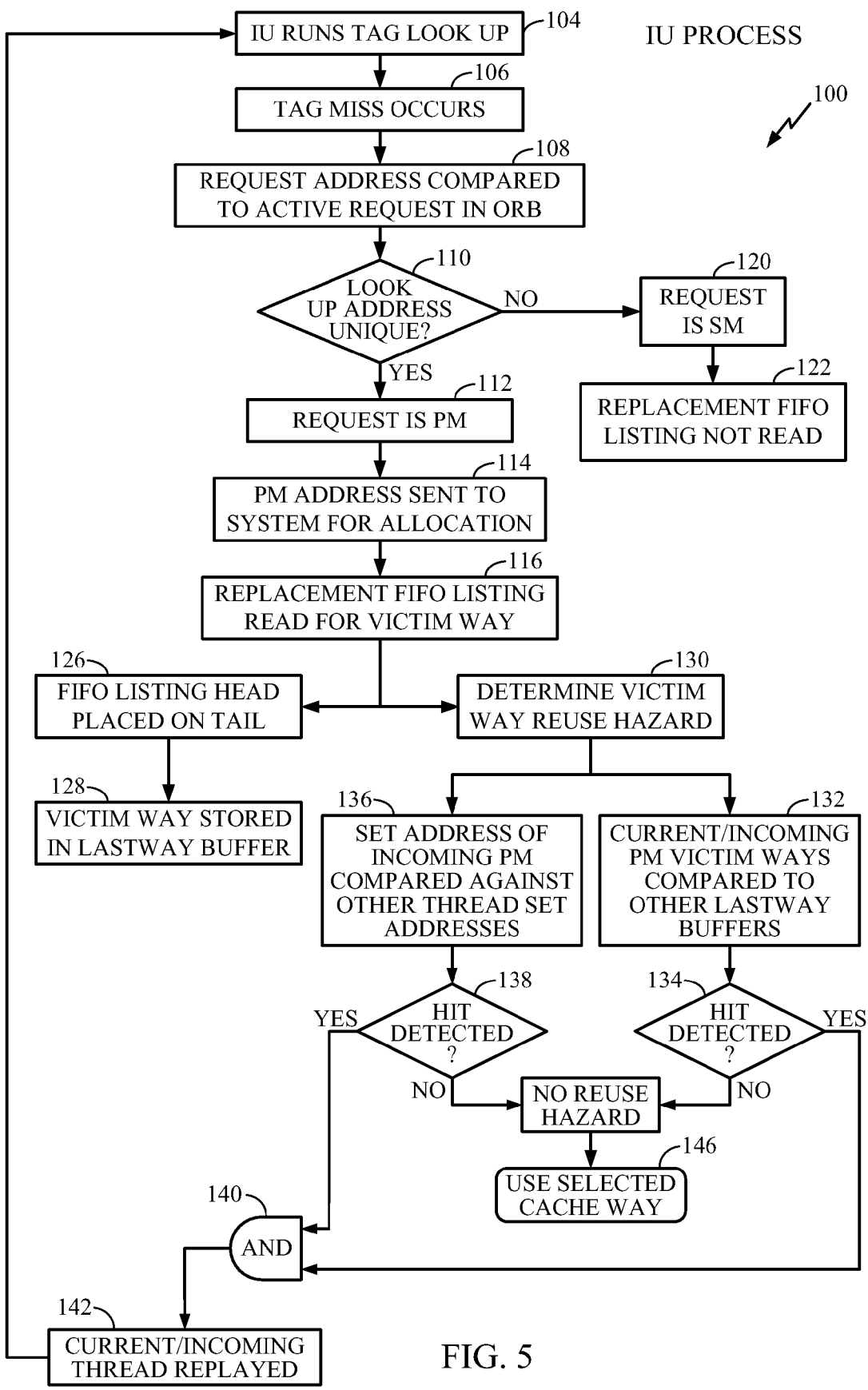
Figure 6:
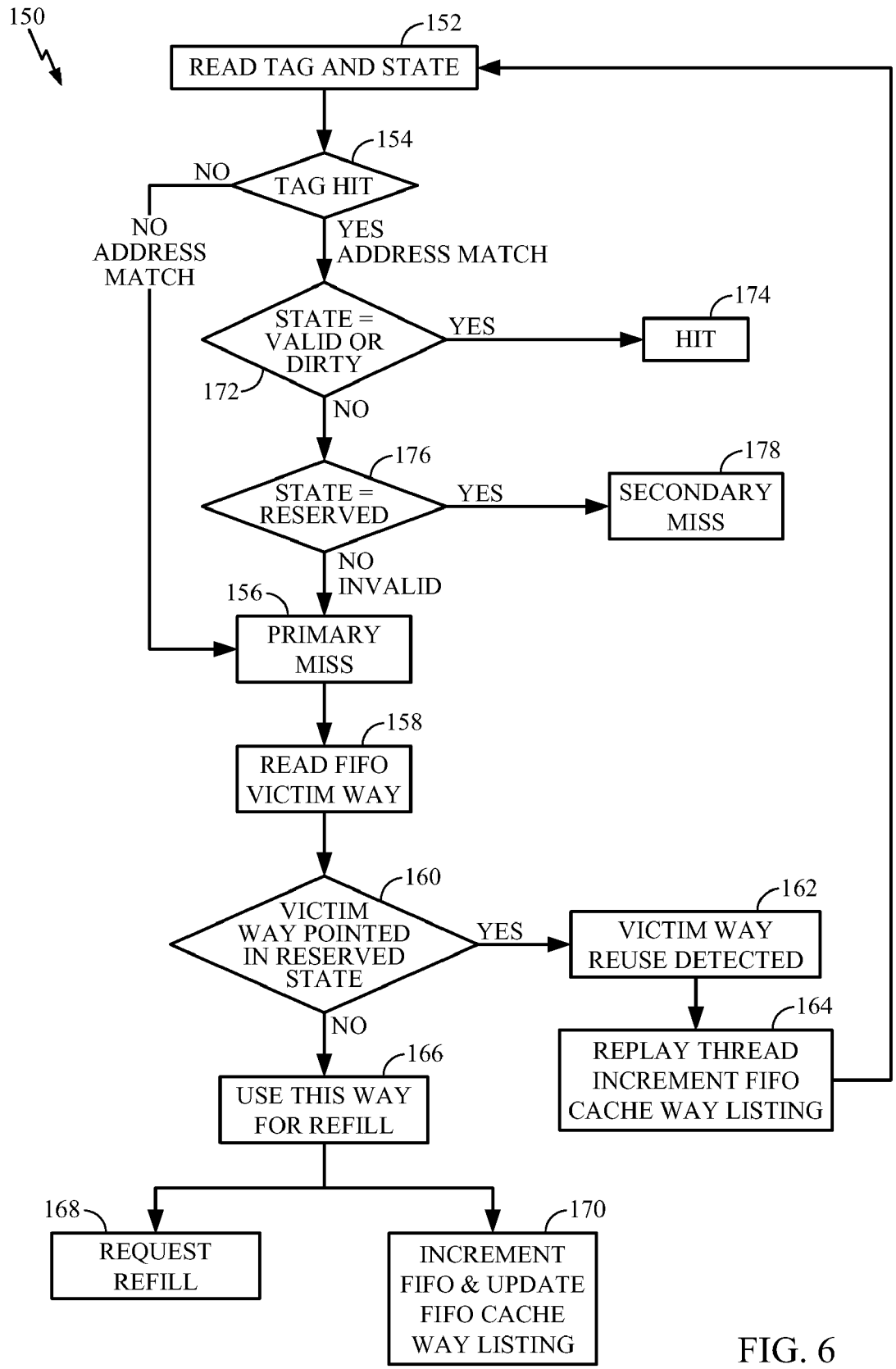

FIG. 4 presents a block diagram of a data unit (DU) as an exemplary circuit that may employ the cache way replacement process of the present disclosure;

FIG. 5 details one implementation of a flowchart for teaching the use of the present disclosure in an instruction unit (IU), such as presented in FIG. 3; and FIG. 6 details one implementation of a flowchart for another use of the presently disclosed subject matter in a data unit (DU) as illustrated in FIGS. 3 and 4.

DETAILED DESCRIPTION OF THE SPECIFIC EMBODIMENTS

The disclosed subject matter of a method and system for maximum residency replacement of cache memory as here presented has use in a very wide variety of digital signal processing applications, including those involving multi-threaded processing. One such application appears in telecommunications and, in particular, in wireless handsets that employ one or more DSP circuits. Consequently, the following FIGUREs describe a telecommunications DSP within which one may use the present teachings. Remember, however, that the implementation here described provides but one of a virtually limitless set of applications to which the disclosed subject matter may apply.

Figure 1:
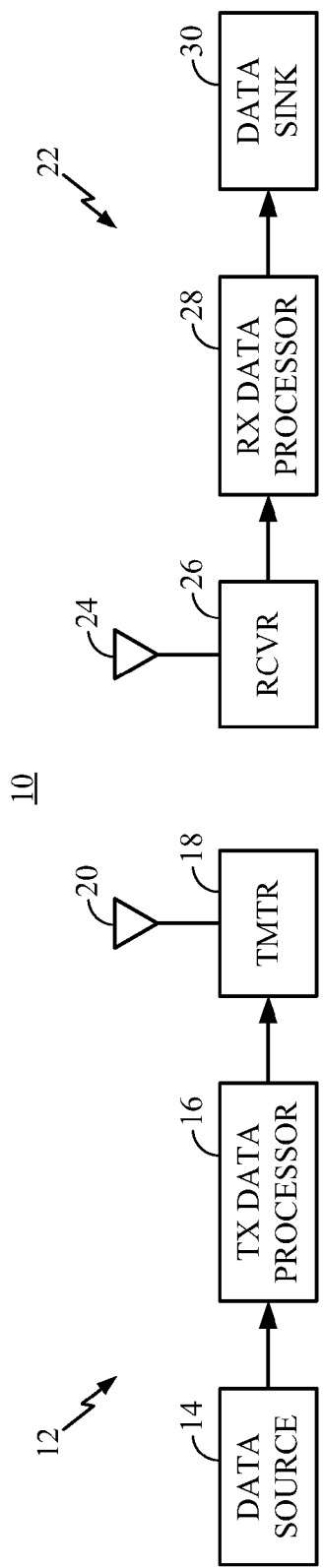
FIG. 1 is a simplified block diagram of a communications system that can implement the present embodiment.

For the purpose of explaining how such a wireless handset may be used, FIG. 1 provides a simplified block diagram of communications system 10 that may implement the presented embodiments of the disclosed data processing method and system. At transmitter unit 12, data is sent, typically in blocks, from data source 14 to transmit (TX) data processor 16 that formats, codes, and processes the data to generate one or more analog signals. The analog signals are then provided to transmitter (TMTR) 18 that modulates, filters, amplifies, and up converts the baseband signals to generate a modulated signal. The modulated signal is then transmitted via antenna 20 to one or more receiver units.

At receiver unit 22, the transmitted signal is received by antenna 24 and provided to receiver (RCVR) 26. Within receiver 26, the received signal is amplified, filtered, down converted, demodulated, and digitized to generate in phase (I) and (Q) samples. The samples are then decoded and processed by receive (RX) data processor 28 to recover the transmitted data. The decoding and processing at receiver unit 22 are performed in a manner complementary to the coding and processing performed at transmitter unit 12. The recovered data is then provided to data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity. Communications system 10 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA standard.

Figure 2:
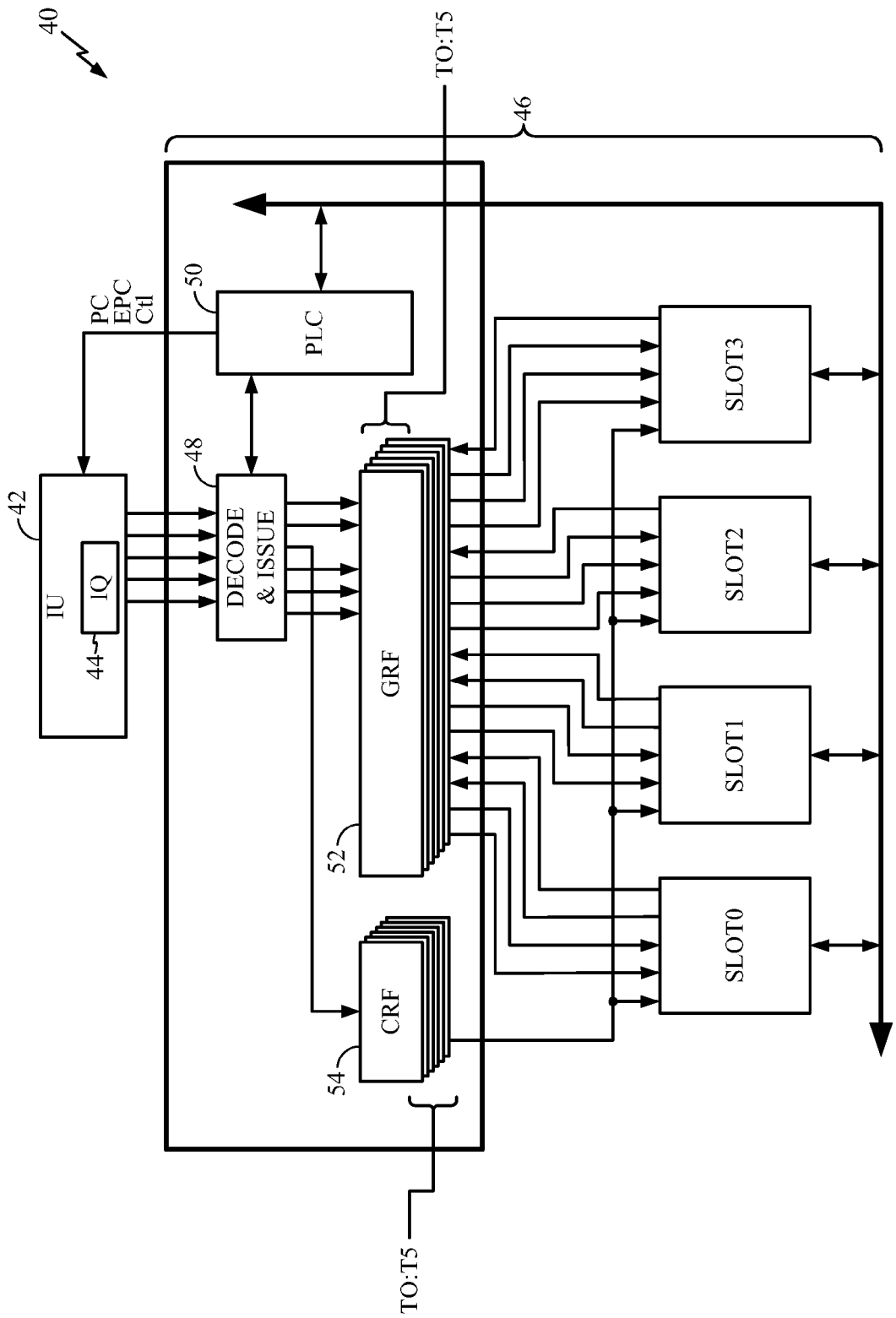
FIG. 2 illustrates a DSP architecture for carrying forth the teachings of the present embodiment.

FIG. 2 illustrates DSP 40 architecture that may serve as transmit data processor 16 and receive data processor 28 of FIG. 1. Once more, emphasis is made that DSP 40 architecture only represents one embodiment among a great many of possible digital signal processor embodiments that may effectively use the teachings and concepts here presented. DSP 40 represents a multi-threaded processor wherein threads T0:T5 contain sets of instructions. Instructions are queued through instruction unit (IU) 42 into instruction queue (IQ) 44. Instructions in IQ 44 are ready to be issued into processor pipeline 46. From IQ 44, a single thread, e.g., thread T0, may be selected by decode & issue logic circuit 48.

IQ 44 in IU 42 keeps a sliding buffer of the instruction stream. Each of the six threads T0:T5 that DSP 40 supports has a separate IQ 44, where each entry may store one VLIW packet or up to four individual instructions. Decode and issue circuitry 48 logic is shared by all threads for decoding and issuing a VLIW packet or up to two superscalar instructions at a time, as well as for generating control buses and operands for each pipeline SLOT0:SLOT3. PLC 50 is also shared by all threads for resolving exceptions and detecting pipeline stall conditions such as thread enable/disable, replay conditions, maintains program flow etc.

In operation, general register file (GRF) 52 and control register file (CRF) 54 of a selected thread is read, and read data is sent to execution data paths for SLOT0:SLOT3. SLOT0:SLOT3, in this example, provide for the packet grouping combination employed in the present embodiment. Output from SLOT0:SLOT3 returns the results from the operations of DSP 40.

The subject matter here disclosed deals with the cache replacement policy of a single thread. A single thread sees a complete uni-processor DSP 40 with all registers and instructions available. Through coherent shared memory facilities, this thread is able to communicate and synchronize with other threads. Whether these other threads are running on the same processor or another processor is largely transparent to user-level software.

Turning to FIG. 3, the present micro-architecture 60 for DSP 40 includes control unit (CU) 62, which performs many of the control functions for processor pipeline 46. CU 62 schedules threads and requests mixed 16-bit and 32-bit instructions from IU 42. CU 62, furthermore, schedules and issues instructions to three execution units, shift-type unit (SU) 64, multiply-type unit (MU) 66, and load/store unit (DU) 68. CU 62 also performs superscalar dependency checks. Bus interface unit (BIU) 70 interfaces IU 42 and DU 68 to a system bus (not shown).

SLOT0 and SLOT1 pipelines are in DU 68, SLOT2 is in MU 66, and SLOT3 is in SU 64. CU 62 provides source operands and control buses to pipelines SLOT0:SLOT3 and handles GRF 52 and CRF 54 file updates. CU 62 accepts external inputs such as interrupts and reset, and supports emulation unit (EU) 72. CU 62 also handles exceptions due to protection violations occurring during address translations. Mixed 16- and 32-bit instructions can be issued in parallel, up to four at a time, in one embodiment of micro-architecture 60. However, many different variations of 16-bit, 32-bit, and other length instructions may be implemented in other embodiment, all within the scope of the disclosed subject matter. Micro-architecture 60, furthermore, may also support moving two 64-bit double words from CU 62 for each cycle.

DSP 40, using micro-architecture 60, specifically supports the following classes of applications: (1) communications signal-processing (e.g., modems); (2) video processing (e.g., H.264 format); (3) image processing; (4) audio processing; (5) 3-D graphics front-end software; and (6) supporting control code, protocol stacks, RTOS, etc. As such, DSP 40 issues both VLIW instruction packets, as well as individual superscalar issue instructions. Issue width for individual instructions can range from one instruction per issue slot to maximum VLIW packet. As an example, DSP 40 may issue as many as four instructions in a VLIW packet per issue slot. Also, DSP 40 may issue one or two instructions using superscalar issue.

FIG. 4 presents a representative DU 68, block partitioning wherein may apply the disclosed subject matter. DU 68 includes an address generating unit, AGU 80, which further includes AGU0 81 and AGU1 83 for receiving input from CU 62. The subject matter here disclosed has principal application with the operation of DU 68. Load/store control unit, LCU 82, also communicates with CU 62 and provides control signals to AGU 80 and ALU 84, as well as communicates with data cache unit, DCU 86. ALU 84 also receives input from AGU 80 and CU 62. Output from AGU 80 goes to DCU 86. DCU 86 communicates with memory management unit ("MMU") 87 and CU 62. ALU 84 includes ALU0 85 and ALU1 89, one for each slot and contains the data path to perform arithmetic/transfer/compare (ATC) operations within DU 68.

DCU 86 includes SRAM state array circuit 88, store aligner circuit 90, CAM tag array 92, SRAM data array 94, and load aligner circuit 96. To further explain the operation of DU 68, wherein the claimed subject matter may operate, reference is now made to the basic functions performed therein according to the several partitions of the following description. In particular, DU 68 executes load-type, store-type, and 32-bit instructions from ALU 84.

DU 68 receives up to two decoded instructions per cycle from CU 62 in the DE pipeline stage including immediate operands. In the RF pipeline stage, DU 68 receives general purpose register (GPR) and/or control register (CR) source operands from the appropriate thread specific registers. The GPR operand is received from the GPR register file in CU 62. In the EX1 pipeline stage, DU 68 generates the effective address (EA) of a load or store memory instruction. The EA is presented to MMU 87, which performs the virtual-to-physical address translation and page level permissions checking and provides page level attributes. For accesses to cacheable locations, DU 68 looks up the data cache tag in the EX2 pipeline stage with the physical address. If the access hits, DU 68 performs the data array access in the EX3 pipeline stage.

For cacheable loads, the data read out of the cache is aligned by the appropriate access size, zero/sign extended as specified and driven to CU 62 in the WB pipeline stage to be written into the instruction specified GPR. For cacheable stores, the data to be stored is read out of the thread specific register in the CU 62.

DU 68 also executes cache instructions for managing DCU 86. The instructions allow specific cache ways to be locked and unlocked, invalidated, and allocated to a GPR specified cache way. There is also an instruction to globally invalidate the cache. These instructions are pipelined similar to the load and store instructions. For loads and stores to cacheable locations that miss the data cache, and for uncacheable accesses, DU 68 presents requests to BIU 70. Uncacheable loads present a read request. Store hits, misses and uncacheable stores present a read/write request. DU 68 tracks outstanding read and line fill requests to BIU 70. DU 68 also allows accesses by other threads while one or more threads are blocked, pending completion of outstanding load requests. That is, DU 68 supports read/write requests both to and from the DSP 40 core processor. BIU 70, therefore, provides a bi-directional interface to the bus for these operations.

Generally speaking, two types of stores may occur in cache memories applicable to the present disclosure. The "write-back" store simply stores in cache memory to update cache memory in the event of cache way hit. If a cache way miss occurs, then data simply will not be available for cache memory update purposes. Write-back stores are not communicated via BIU 70 to a bus. On the other hand, "write-through" stores change cache memory data as well as are communicated back to a bus. For writ-through stores, data may yet be communicated back to a bus in the event of a cache miss. Regardless of the particular type of cache memory store occurring, the presently disclosed subject matter provides an improved method and system for maximum replacement of cache memory.

The disclosed subject matter, therefore, provides a "first-in, first-out" or "FIFO" listing process for cache replacement operations during digital signal processing, such as those occurring in DU 68. A technical advantage of the disclosed process is the avoidance of the need to track which cache way has been most recently used. With the present FIFO cache replacement process, there is only the need to determine the presence of available cache resources. There is no requirement to maintain a running record of the access patterns to cache memory.

The disclosed subject matter updates the cache way listing only in the event that a cache way miss occurs. Thus, when many misses occur, the process of the disclosed subject matter will operate continually to identify cache ways for use replacement on the FIFO cache way listing. On the other hand, if cache misses do not occur, then the process here disclosed does not continuously update. The present FIFO cache replacement process waits until a next cache miss occurs.

The FIFO cache replacement process bases the next cache way to replace according to the cache ways that have been replaced from the FIFO cache way listing. Accordingly, if no way is being replaced, the FIFO cache way listing of cache ways to replace will not change. The oldest cache way on the FIFO cache way listing, on the other hand, will be least likely to be used and the most likely to be removed from the FIFO cache way listing. With the disclosed subject matter, when a request lookup receives a cache tag miss, one of the set ways must be replaced. The cache way that is selected for replacement is referred to as the victim way since, in certain cases, the cache contents of the victim way must be removed from the cache to make room for the tag miss allocation. These cases arise when the contents in the cache are, for one reason or another, different from the contents in the DSP 40 main memory. For example, if a store in a line occurs, the contents may change, thereby requiring the need for replacement.

In order to maximize the time each way remains in the cache, the victim way is placed on the tail of a set-based FIFO cache way listing following a cache miss. The depth of the replacement FIFO cache way listing is equal to the number of ways in the cache memory, thereby maximizing the time or residency of miss allocation before the same-way is evicted again. Subsequent tag misses to the same set will likewise generate a victim way and be placed on the tail of the set FIFO. Each new victim forces earlier victims towards the replacement FIFO cache way listing head. When the number of same-set victims equal the number of cache ways, a victim way is reused on the next tag miss.

The implementation of the FIFO replacement policy as herein disclosed maximizes cache residency based on the number of ways in each set. This policy also makes use of the data according to its age on the FIFO cache way listing. The disclosed process replaces from the FIFO cache way listing the cache way that was earliest listed. So, that the FIFO cache way listing only includes those most recently used cache ways. If an outstanding allocation request already exists for an earlier tag miss, the current tag miss does not update the FIFO cache way listing.

In the instance when a victim way is placed on the FIFO cache way listing tail, it is possible that the same way will reach the head and be reused before the initial allocation completes. This hazard may lead to incoherency between the tag and data caches if the victim way reuse is not corrected. Several possible solutions to this hazard exist. One solution may be to stall or replay the reuse request or reading the FIFO cache way listing head a second time after the reuse way is placed on the FIFO cache way listing tail.

With this introduction, two implementations will be described in FIGS. 5 and 6. These implementations may be used in a digital signal processor, such as DSP 40 in IU process 100 of FIG. 5 and DU process 150 of FIG. 6. First, consider process 100, wherein IU 42 runs a tag lookup, beginning at step 104, and a tag miss may occur at step 106. In such case, the request address is compared, at step 108, to the active requests stored in an outstanding request buffer (ORB). If the lookup address is unique, at step 110, the request is considered a primary miss (PM) at step 112. If the request is a primary miss, then the process references the FIFO buffer for a possible victim way to use for replacement at step 114. At step 116, the FIFO cache way listing is read for a victim way. If in step 110, ORB detects that request address is not unique, the request is considered a secondary miss (SM) at step 120. In this case, the replacement FIFO cache way listing is not read and cache residency is maximized at step 122.

From step 116, process flow 100 goes to both steps 126 and 130. At step 126, the FIFO cache way listing head is placed at the listing tail and, at step 128, the victim way is stored in a last way buffer. With this step, the FIFO cache way listing head exposes a new victim way from the sequential listing, which listing is modulo the number of available ways (e.g., modulo 16 in the event of 16 available cache ways). At step 130, process flow 100 determines the presence of a victim way reuse hazard. This includes comparing the current/incoming victim way to other lastway buffers at step 132, after which a query of whether a hit is detected occurs at step 134. Also, the set address of the incoming primary miss is compared against other thread set addresses at step 136, after which a query of whether a hit is detected occurs at step 138. If a hit is detected at query 134 and at query 138, then process flow continues to AND step 140. AND step 140, in response to each of queries 134 and 138 detecting a hit provides input to step 142, at which point process 100 replays the current/incoming thread. That is, if a hit is detected at both queries 134 and 138, then a reuse hazard exists. Process flow 100 then returns to step 104 at which IU 42 runs a tag look up. In the event of either no hit detected at query 134 or query 138, then process flow 100 goes to step 144 at which it is determined that a reuse hazard does not exist. If no reuse hazard exists, then process flow 100 continues to final step 146 for use of the selected cache way.

By pipelining the replacement FIFO cache way listing access behind the determination for a victim way allocation, IU 42 can immediately move the victim way from the head to the tail of the FIFO cache way listing in the same clock. This allows IU 42 to support back-to-back multi-thread accesses in the replacement FIFO cache way listing without replays.

IU 42 may implement the replacement FIFO cache way listing as a simple 4-bit counter. Each primary miss reads the replacement set counter and increments the set counter by one. The set counter is always incremented on a primary miss, clearing the reuse hazard before the thread that hit the hazard is replayed. There may be other ways of implementing the disclosed subject matter on an IU 42 or similar circuitry that may exist on a DSP such as DSP 40.

FIG. 6 details steps of the disclosed subject matter for providing a FIFO cache way replacement process 150 as may applied to DU 68 within DSP 40. At step 152, FIFO cache way replacement process 150 reads the tag and state of the cache memory associated with DU 68. Then, query 154 represents the step of determining that a tag hit has occurred. That is, a tag hit occurs in the event of an address match; not so, if there is no address match. If a tag hit does not occur, then process 150 flow goes to step 156, where it is determined that a primary miss exists. At step 158, process 150 reads the FIFO cache way listing to obtain a victim way.

Query 160 then determines whether the obtained victim way is pointed in a reserved state. If the victim way points to a reserved state, then process 150 goes to step 162 at which a victim way reuse hazard is detected. At step 164, process 150 replays the thread and increments the FIFO cache way listing. Thereafter, process 150 returns to step 152 for again reading the tag and state.

If query 160 determines that the victim way does not point in a reserved state, then process 150 goes to step 166. At step 166, the obtained victim way is used for refill. Then, the refill request is executed at step 168 and, at step 170, the FIFO cache way listings incremented and updated. Returning to query 154, if a tag hit is detected, i.e., an address match occurs, then process 150 goes to query 172. Query 172 tests whether the state of the hitting cache way is valid or dirty. If valid or dirty (i.e., the data associated with the cache way differs from the corresponding data in core memory), then process 150 goes to step 174, at which point the determination is made that a cache hit has occurred. Otherwise, query 172 continues process flow 150 to query 176. At query 176, a test of whether a reserved state for the hitting cache way exists. If so, then process flow goes to step 178, at which it is determined that a secondary miss exists. If query 176 determines that a reserved state does not exist, then a primary miss exists and process 150 goes back to step 156 at which it is determined that a primary miss exists, since the state has now been determined as invalid. Then, process flow 150 may proceed as previously described from step 156, above.

With the present embodiment, DU 68 may update the replacement FIFO cache way listing and maintain maximum cache residency and cache coherency. Other implementations of the disclosed subject matter, however, may not support back-to-back multi-thread accesses in the replacement FIFO cache way listing, as described above. Such may occur where the addition of state and replacement bypass serves to maintain accurate state and FIFO cache way listing information until they are written back to their set. There may be other ways to implement the presently disclosed subject matter in DU 68 and similarly functioning portions of a DSP such as DSP 40.

The disclosed subject matter, therefore, provides a method for replacing one of a plurality of set ways of a cache memory in the event of a cache tag miss. The disclosure includes the step of selecting a victim way as the cache way that is to be replaced by placing the victim way on the tail of a FIFO cache way listing following the cache misses, wherein the depth of the FIFO approximately equals the number of ways in the cache memory. Next, the process places at the end of the FIFO cache way listing subsequent cache tag misses to the cache memory. The process then involves reusing a victim way on a next cache tag miss in the event that the number of victim ways for the cache memory equals the number of cache memory ways. Reuse of a victim way is prevented until initial allocation of the victim way completes. This avoids incoherency between the cache tag and the cache memory. Moreover, the process prevents reuse of a victim way until initial allocation of the victim way completes by stalling a reuse request until such initial allocation of the victim way completes. The process also prevents reuse of a victim way until initial allocation of the victim way completes by replaying a reuse request until such initial allocation of the victim way completes. By performing this process, and ones substantially similar to it, the disclosed subject provides an efficient cache way replacement policy that, together with the implementing circuitry, avoids the existing limitations of the known LRU and NRU algorithms.

The processing features and functions described herein can be implemented in various manners. For example, not only may DSP 40 perform the above-described operations, but also the present embodiments may be implemented in an application specific integrated circuit (ASIC), a microcontroller, a microprocessor, or other electronic circuits designed to perform the functions described herein. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method for replacing one of a plurality of set ways of a cache memory in the event of a cache tag miss, the method comprising:

selecting a victim way as a cache way that is to be replaced according to a position of said cache way on a FIFO cache way listing of cache ways for use in the operation of a digital signal processor;

placing at the end of said FIFO cache way listing subsequent cache tag misses to said cache memory reusing a victim way on a next cache tag miss;

preventing reuse of a victim way until initial allocation of said victim way completes avoiding incoherency between the cache tag and said cache memory by stalling a response to a reuse request until such initial allocation of said victim way completes and replaying a reuse request until such initial allocation of said victim way completes.

2. The method of claim 1, wherein said selecting step further comprises the step of selecting a victim way as the cache way that is to be replaced by placing said victim way on the tail of a FIFO cache way listing following said cache miss and wherein the depth of said FIFO approximately equals the number of ways in said cache memory.

3. The method of claim 1, further comprising the step of skipping said victim way and selecting a different victim way in the event of detecting a reuse hazard associated with the use of said victim way.

4. The method for claim 3, further comprising the steps of: performing a tag look up for obtaining a replacement victim way, and, in the event of no hit being detected with said replacement victim way, determining that a reuse hazard does not exist, and, in the event of no reuse hazard existing with said replacement victim way, using said replacement victim way for replacing one of said plurality of set ways.

5. The method of claim 1, further comprising the step of replacing one of a plurality of set ways of a cache memory in the event of a cache tag miss in association with the execution of digital signal processor data unit instructions.

6. The method of claim 5, in the event of a victim way reuse hazard, further comprising the steps of:

comparing a current/incoming primary miss victim way to other ways in said FIFO cache way listing;

comparing the set address of the incoming primary miss against other set addresses; and in response to said comparing steps, replaying the current/incoming thread until a victim way arises that is free from a reuse hazard.

7. The method of claim 1, further comprising the step of replacing one of a plurality of set ways of a cache memory in the event of a cache tag miss in association with the execution of digital signal processor instruction unit instructions.

8. The method of claim 7, in the event of a victim way reuse hazard, further comprising the steps of:

comparing a current/incoming primary miss victim way to other ways in said FIFO cache way listing;

comparing the set address of the incoming primary miss against other set addresses; and in response to said comparing steps, replaying the current/incoming thread until a victim way arises that is free from a reuse hazard.

9. The method of claim 1, further comprising the step of adding the most recently used victim way to the tail of said FIFO cache way listing.

10. The method of claim 1, further comprising the step of replacing said victim way in a multi-threaded digital signal processor.

11. The method of claim 1, further comprising the step of performing said replacement steps without requiring use of a storage bit for recording used victim ways.

12. The method for claim 1, further comprising the step of only incrementing said FIFO cache way listing in the event of a cache way miss.

13. The method of claim 1, further comprising the step of performing back-to-back multi-thread accesses in said replacement FIFO cache way listing without replaying said listing.

14. A cache way replacement circuit for operation in association with a digital signal processor, said cache way replacement circuit for replacing one of a plurality of set ways of a cache memory in the event of a cache tag miss and comprising:

victim way selection circuitry for selecting a victim way as a cache way that is to be replaced according to a position of said cache way on a FIFO cache way listing of cache ways for use in the operation of the digital signal processor;

FIFO cache way listing populating circuitry for placing at the end of said FIFO cache way listing subsequent cache tag misses to said cache memory reusing a victim way on a next cache tag miss; and cache way reuse hazard detection circuitry for preventing reuse of a victim way until initial allocation of said victim way completes, avoiding incoherency between the cache tag and said cache memory by stalling a response to a reuse request until such initial allocation of said victim way completes and replaying a reuse request until such initial allocation of said victim way completes.

15. The cache way replacement circuit of claim 14, further comprising victim way selection circuitry for selecting a victim way as the cache way that is to be replaced by placing said victim way on the tail of a FIFO cache way listing following said cache miss and wherein the depth of said FIFO approximately equals the number of ways in said cache memory.

16. The cache way replacement circuit of claim 14, further comprising data unit circuitry for replacing one of a plurality of set ways of a cache memory in the event of a cache tag miss in association with the execution of digital signal processor data unit instructions.

17. The cache way replacement circuit of claim 14, further comprising:

comparison circuitry for comparing a current/incoming primary miss victim way to other ways in said FIFO cache way listing and comparing the set address of the incoming primary miss against other set addresses; and cache way replaying circuitry for replaying the current/incoming thread in response to said comparing steps until a victim way arises that is free from a reuse hazard.

18. The cache way replacement circuit of claim 14, further comprising circuitry for skipping said victim way and selecting a different victim way in the event of detecting a reuse hazard associated with the use of said victim way.

19. The cache way replacement circuit of claim 18, further comprising circuitry and instructions for performing a tag look up for obtaining a replacement victim way, and, in the event of no hit being detected with said replacement victim way, determining that a reuse hazard does not exist, and, in the event of no reuse hazard existing with said replacement victim way, using said replacement victim way for replacing one of said plurality of set ways.

20. The cache way replacement circuit of claim 19, further comprising instruction unit circuitry for replacing one of a plurality of set ways of a cache memory in the event of a cache tag miss in association with the execution of digital signal processor instruction unit instructions.

21. The cache way replacement circuit of claim 20, further comprising:
  comparison circuitry for comparing a current/incoming primary miss victim way to other ways in said FIFO cache way listing and comparing the set address of the incoming primary miss against other set addresses; and
  cache way replaying circuitry for replaying the current/incoming thread in response to said comparing steps until a victim way arises that is free from a reuse hazard.

22. The cache way replacement circuit of claim 14, further comprising FIFO cache way listing circuitry for adding the most recently used victim way to the tail of said FIFO cache way listing.

23. The cache way replacement circuit of claim 14, further comprising multi-threaded digital signal processing circuitry replacing said victim way in a multi-threaded digital signal processor.

24. The cache way replacement circuit of claim 14, further comprising replacement circuitry permitting the performance of said replacement steps without requiring use of a storage bit for recording used victim ways.

25. The cache way replacement circuit of claim 14, further comprising incrementing circuitry for only incrementing said FIFO cache way listing in the event of a cache way miss.

26. The cache way replacement circuit of claim 14, further comprising incrementing circuitry for performing back-to-back multi-thread accesses in said replacement FIFO cache way listing without replaying said listing.

27. A digital signal processor including means for replacing one of a plurality of set ways of a cache memory in the event of a cache tag miss, the digital signal processor comprising:
  means for selecting a victim way as a cache way that is to be replaced according to a position of said cache way on a FIFO cache way listing of cache ways for use in the operation of the digital signal processor;
  means for placing at the end of said FIFO cache way listing subsequent cache tag misses to said cache memory reusing a victim way on a next cache tag miss; and
  means for preventing reuse of a victim way until initial allocation of said victim way completes avoiding incoherency between the cache tag and said cache memory by stalling a response to a reuse request until such initial allocation of said victim way completes and replaying a reuse request until such initial allocation of said victim way completes.

28. The digital signal processor of claim 27, further comprising means for selecting a victim way as the cache way that is to be replaced by placing said victim way on the tail of a FIFO cache way listing following said cache miss and wherein the depth of said FIFO approximately equals the number of ways in said cache memory.

29. The digital signal processor of claim 27, further comprising means for replacing one of a plurality of set ways of a cache memory in the event of a cache tag miss in association with the execution of digital signal processor data unit instructions.

30. The digital signal processor of claim 29, further comprising:
  means for comparing a current/incoming primary miss victim way to other ways in said FIFO cache way listing;
  means for comparing the set address of the incoming primary miss against other set addresses; and
  means for in response to said comparing steps, replaying the current/incoming thread until a victim way arises that is free from a reuse hazard.

31. The digital signal processor of claim 27, further comprising means for replacing one of a plurality of set ways of a cache memory in the event of a cache tag miss in association with the execution of digital signal processor instruction unit instructions.

32. The digital signal processor of claim 31, further comprising:
  means for comparing a current/incoming primary miss victim way to other ways in said FIFO cache way listing;
  means for comparing the set address of the incoming primary miss against other set addresses; and
  means for in response to said comparing steps, replaying the current/incoming thread until a victim way arises that is free from a reuse hazard.

33. The digital signal processor of claim 27, further comprising:
  means for comparing a current/incoming primary miss victim way to other ways in said FIFO cache way listing;
  means for comparing the set address of the incoming primary miss against other set addresses; and
  means for replaying the current/incoming thread in response to said comparing steps until a victim way arises that is free from a reuse hazard.

34. The digital signal processor of claim 27, further comprising means for adding the most recently used victim way to the tail of said FIFO cache way listing.

35. The digital signal processor of claim 27, further comprising means for replacing said victim way in a multi-threaded digital signal processor.

36. The digital signal processor of claim 27, further comprising means for performing said replacement steps without requiring use of a storage bit for recording used victim ways.

37. The digital signal processor of claim 27, further comprising means for only incrementing said FIFO cache way listing in the event of a cache way miss.

38. A computer usable storage medium having computer readable program code means embodied therein for processing instructions on a digital signal processor for replacing one of a plurality of set ways of a cache memory in the event of a cache tag miss, said computer readable medium comprising:
  computer readable program code means for selecting a victim way as a cache way that is to be replaced according to a position of said cache way on a FIFO cache way listing of cache ways for use in the operation of the digital signal processor;
  computer readable program code means for placing at the end of said FIFO cache way listing subsequent cache tag misses to said cache memory reusing a victim way on a next cache tag miss; and
  computer readable program code means for preventing reuse of a victim way until initial allocation of said victim way avoids incoherency between the cache tag and said cache memory by stalling a response to a reuse request until such initial allocation of said victim way completes and replaying a reuse request until such initial allocation of said victim way completes.

39. The computer usable storage medium of claim 38, further comprising computer readable program code means for selecting a victim way as the cache way that is to be replaced by placing said victim way on the tail of a FIFO cache way listing following said cache miss and wherein the depth of said FIFO approximately equals the number of ways in said cache memory.

* * * * *

UNITED STATES PATENT AND TRADEMARK OFFICE
CERTIFICATE OF CORRECTION

| | |
|---|---|
| PATENT NO. | : 7,584,326 B2 |
| APPLICATION NO. | : 11/531111 |
| DATED | : September 1, 2009 |
| INVENTOR(S) | : Ahmed |

It is certified that error appears in the above-identified patent and that said Letters Patent is hereby corrected as shown below:

Column 1, line 6, first para: "METHOD ANS SYSTEM" to read as --METHOD AND SYSTEM--

Signed and Sealed this
Twenty-eighth Day of June, 2011

David J. Kappos
*Director of the United States Patent and Trademark Office*